United States Patent
Khay-Ibbat

(10) Patent No.: US 9,467,944 B2
(45) Date of Patent: Oct. 11, 2016

(54) POWER CONSUMPTION REDUCTION FOR CELLULAR BROADCAST

(71) Applicant: Apple Inc., Cupertino, CA (US)

(72) Inventor: Samy Khay-Ibbat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 13/923,434

(22) Filed: Jun. 21, 2013

(65) Prior Publication Data

US 2014/0376429 A1 Dec. 25, 2014

(51) Int. Cl.
*G08C 17/00* (2006.01)
*H04W 52/02* (2009.01)

(52) U.S. Cl.
CPC .......... *H04W 52/0225* (2013.01); *Y02B 60/50* (2013.01)

(58) Field of Classification Search
CPC ............ H04W 52/0216; H04W 52/0235; H04W 52/0209; H04W 52/0206; Y02B 60/50
USPC ............. 370/311, 329; 455/574, 501, 560
See application file for complete search history.

(56) References Cited

U.S. PATENT DOCUMENTS

| | | | |
|---|---|---|---|
| 7,318,187 B2 | 1/2008 | Vayanos et al. | |
| 2005/0143107 A1* | 6/2005 | Pattar | H04W 4/06 455/466 |
| 2006/0223544 A1* | 10/2006 | Lee et al. | 455/450 |
| 2009/0303951 A1* | 12/2009 | Lunttila et al. | 370/329 |
| 2010/0009725 A1* | 1/2010 | Banerjea | 455/574 |
| 2013/0208639 A1* | 8/2013 | Janga et al. | 370/311 |
| 2014/0078945 A1* | 3/2014 | Schwartz et al. | 370/311 |
| 2014/0247760 A1* | 9/2014 | Telang et al. | 370/311 |

FOREIGN PATENT DOCUMENTS

| | | |
|---|---|---|
| EP | 2154794 | 8/2003 |
| EP | 1864536 | 3/2006 |

* cited by examiner

*Primary Examiner* — Andrew Chriss
*Assistant Examiner* — Atique Ahmed
(74) *Attorney, Agent, or Firm* — Meyertons Hood Kivlin Kowert & Goetzel, P.C.; Jeffrey C. Hood

(57) ABSTRACT

Reducing power consumption for cellular broadcast communication by a wireless device. A cellular communication channel for cellular broadcast messages may be monitored in a discontinuous manner according to specified cellular broadcast scheduling periods. Between each pair of cellular broadcast scheduling periods, the wireless device may operate in a reduced power state. During each cellular broadcast scheduling period, at least a cellular broadcast scheduling message may be received. If all scheduled cellular broadcast messages are received prior to an end of a cellular broadcast scheduling period, the wireless device may operate in the reduced power state for the remainder of that cellular broadcast scheduling period after all scheduled cellular broadcast messages are received.

19 Claims, 5 Drawing Sheets

POWER CONSUMPTION REDUCTION FOR CELLULAR BROADCAST

FIELD

The present disclosure relates to wireless devices, and more particularly to a system and method for a wireless device to efficiently operate in conjunction with cellular broadcast services.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

Cellular communication technologies may be capable of providing a variety of services. One service which may be available is cellular broadcast. Amongst various uses, cellular broadcast services may be used to provide various notifications to the public, such as notifications of severe weather events (tornadoes, flash floods, tsunamis, etc.), AMBER alerts, imminent threat alerts, presidential messages, etc. For example, in the United States, the Emergency Alert System (EAS) includes the commercial mobile alert system (CMAS) and wireless emergency alert (WEA) standard. According to these systems, cellular broadcast techniques such as short message service—cellular broadcast (SMS-CB) may be deployed to distribute emergency alert messages to cellular devices in targeted geographical areas.

SUMMARY

Cellular broadcast services may in some cases be scheduled for discontinuous reception (DRX) using an in-band scheduling mechanism. In such a case, a wireless user equipment (UE) device which supports cellular broadcast services may periodically wake to monitor a channel on which cellular broadcast messages may be transmitted during "cellular broadcast scheduling periods", and enter a low/reduced power state between such cellular broadcast scheduling periods. The in-band scheduling mechanism may specifically refer to a technique by which a scheduling message (or "cellular broadcast scheduling message") which schedules the subsequent cellular broadcast scheduling period is received in each cellular broadcast scheduling period. The scheduling message may, for example, include information enabling the UE to determine when the subsequent scheduling period will begin and end, thereby enabling the UE to sleep between scheduling periods without missing any cellular broadcast messages.

However, in some cases the length of the scheduling period reserved for cellular broadcast messages may be longer (sometimes significantly so) than needed to communicate any cellular broadcast messages scheduled in that scheduling period. In such a case, the remainder of the scheduling period after all expected cellular broadcast sages are complete may not include any useful information. mesAccordingly, it would be desirable for a UE to be capable of recognizing such an occurrence and to skip reception of any such remainder of a scheduling period after all expected cellular broadcast messages are complete. Providing a UE with such a capability would have the potential to significantly increase the efficiency (e.g., reduce the power usage profile) of the UE with respect to cellular broadcast services.

Accordingly, embodiments are presented herein of such a method for a UE to operate efficiently in conjunction with cellular broadcast services, and a UE configured to implement the method. The UE may include one or more radios (e.g., including at least a cellular radio), including one or more antennas, for performing wireless communications. The UE device may also include a processing element configured to implement part or all of the method (e.g., by executing program instructions). In addition, the UE device may include a non-transitory computer accessible memory medium, which may store program instructions executable by the UE to implement part or all of the method.

BRIEF DESCRIPTION OF THE DRAWINGS

A better understanding of the present subject matter can be obtained when the following detailed description of the preferred embodiment is considered in conjunction with the following drawings, in which.

Figure 1:
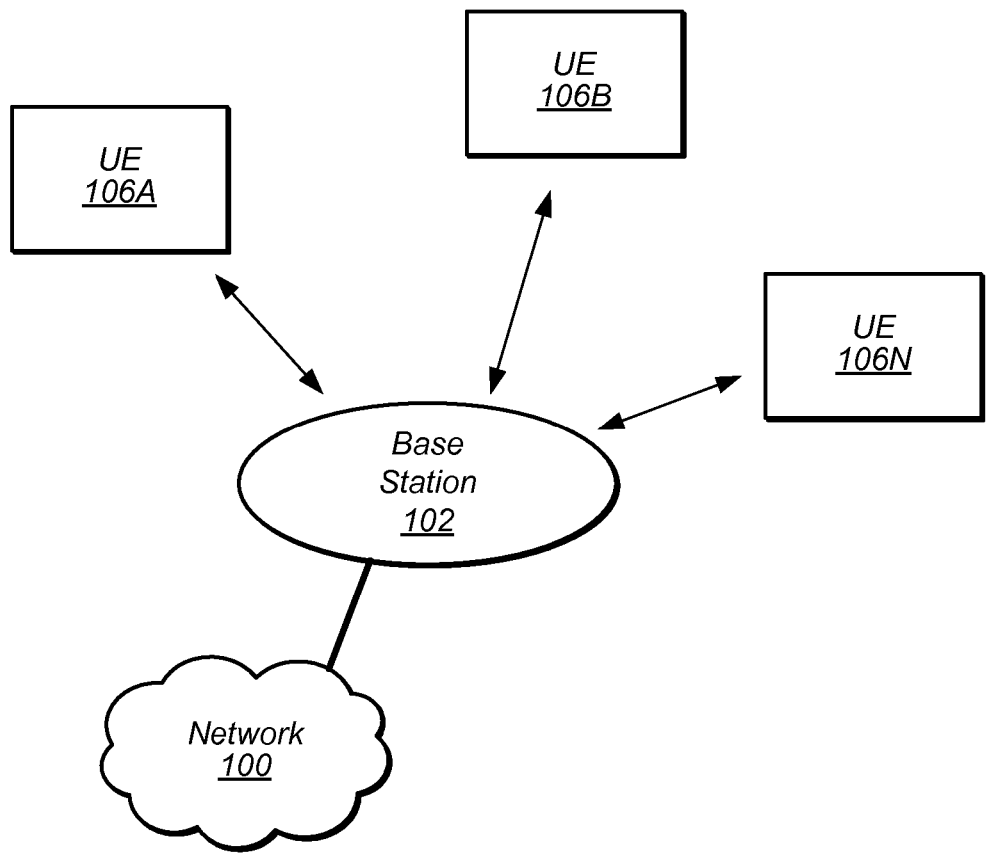
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
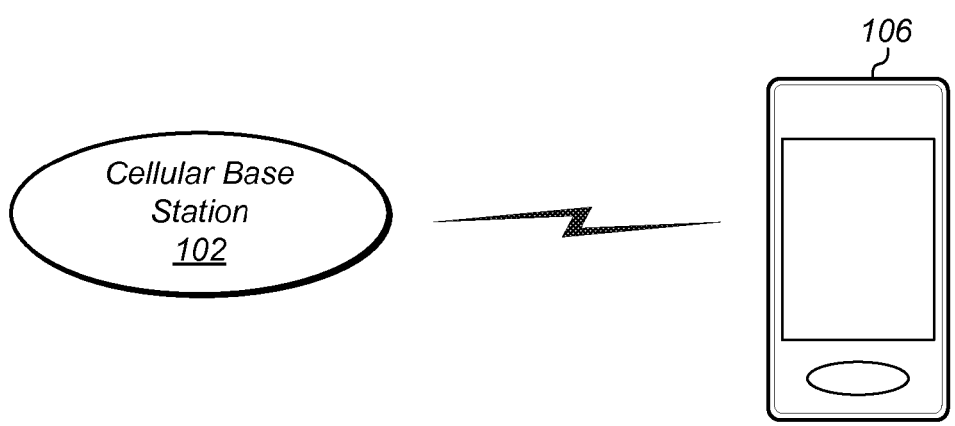
FIG. 2 illustrates a base station (BS) in communication with a user equipment (UE) device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice and SMS services (e.g., typically via circuit-switched wireless links) and/or data services (e.g., typically via packet-switched wireless links). In particular, the cellular base station 102 may provide cellular broadcast services (e.g., via SMS-Cellular Broadcast or SMS-CB) to UEs 106, which may be used to distribute emergency alert messages among various possibilities.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, Wi-Fi, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios or radio components which are shared between multiple wireless communication protocols, and one or more radios or radio components which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible.

Figure 3:
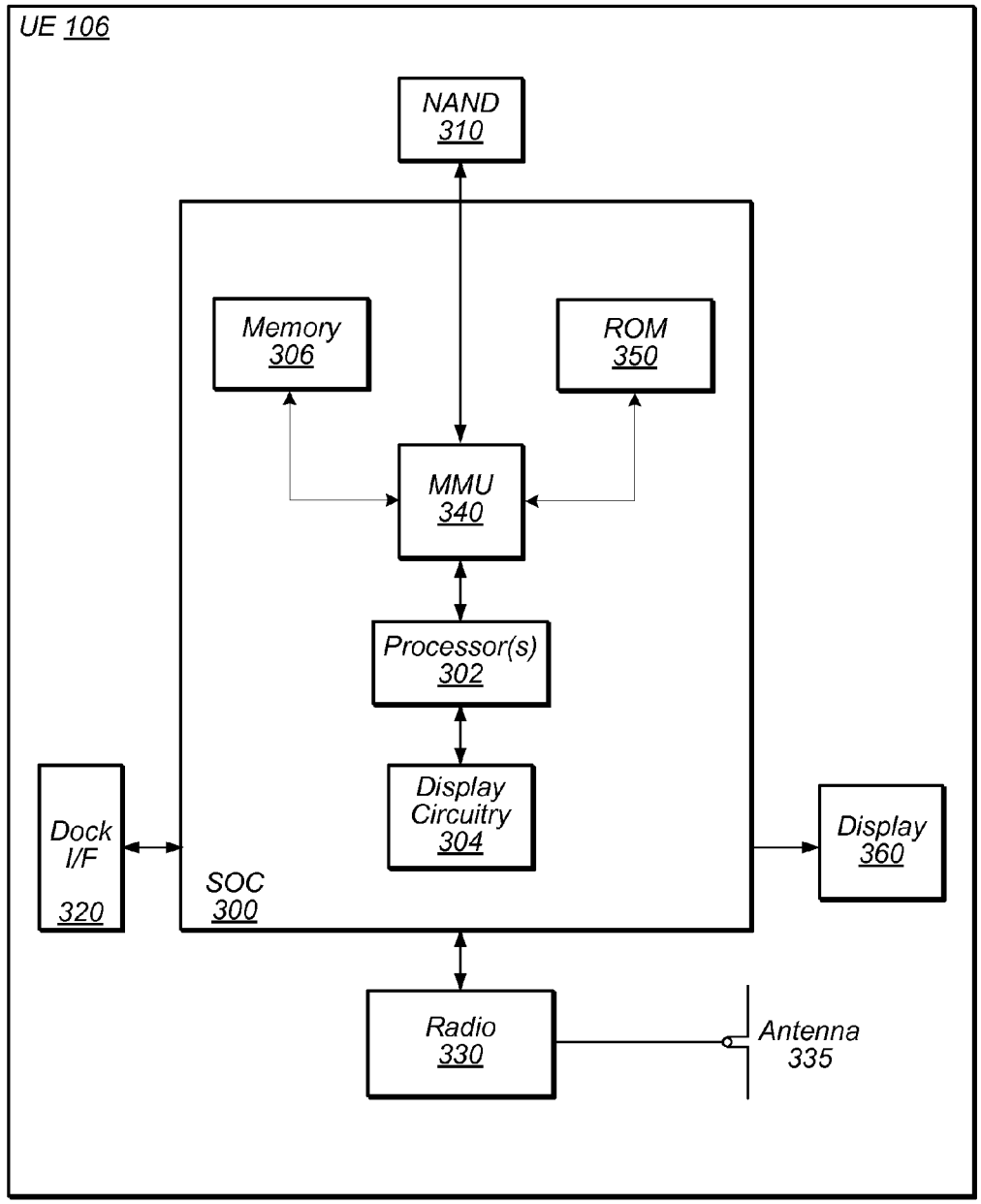
FIG. 3 illustrates an exemplary block diagram of a UE device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (or "radio") 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
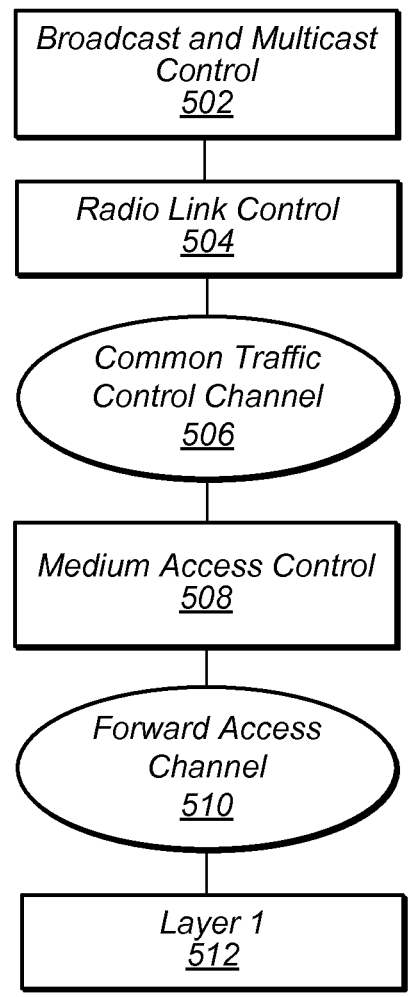
FIG. 5 illustrates an exemplary protocol stack which may be used in conjunction with cellular broadcast services.
Figure 6:
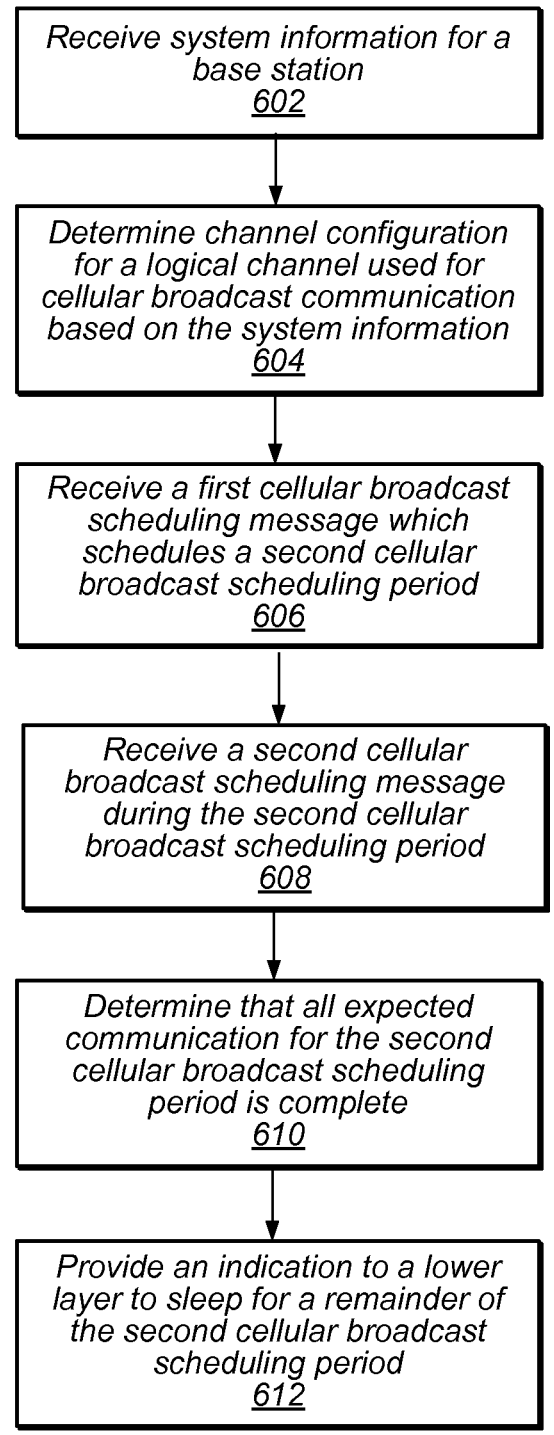
FIG. 6 is a flowchart diagram illustrating aspects of a technique for efficient operation in conjunction with cellular broadcast services.

As described herein, the UE 106 may include hardware and software components for implementing features for operating efficiently in conjunction with cellular broadcast services, such as those described herein with reference to, inter alia, FIG. 5 and/or FIG. 6. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5 and/or FIG. 6.

Figure 4:
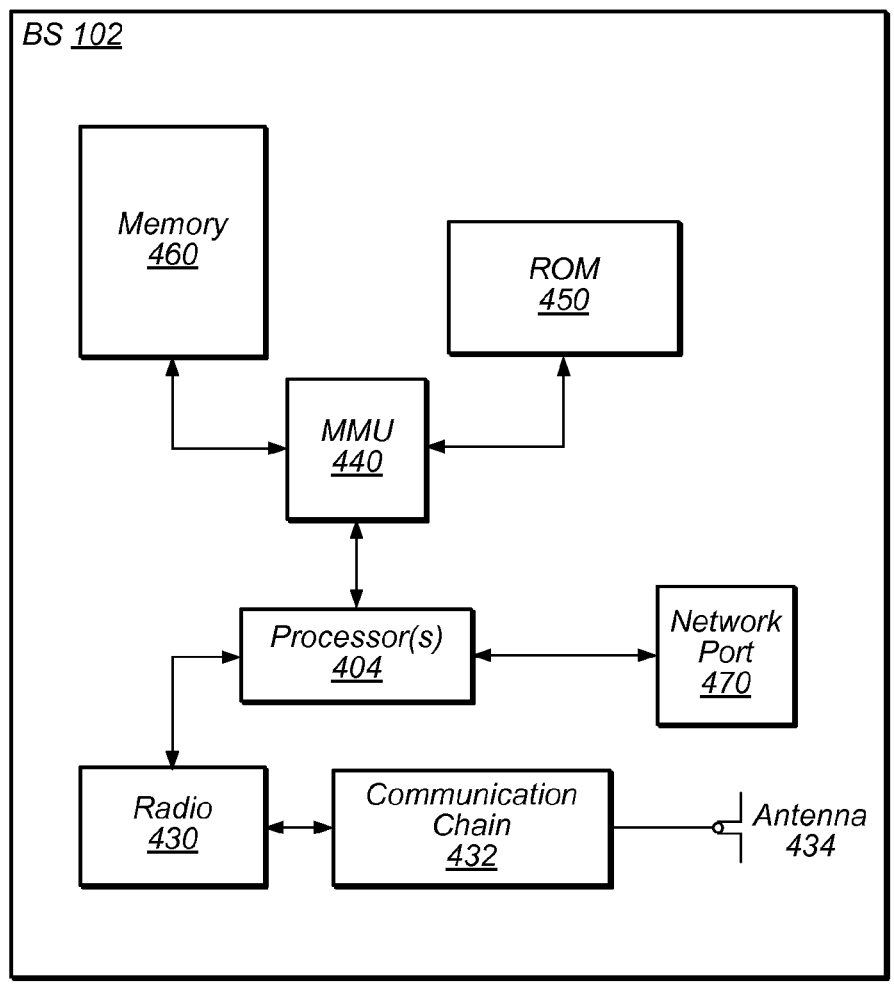
FIG. 4 illustrates an exemplary block diagram of a BS.

FIG. 4—Exemplary Block Diagram of a Base Station

FIG. 4 illustrates an exemplary block diagram of a cellular base station (BS) 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The base station 102 may also be coupled to an Emergency Alert System (EAS) via the network port 470, by which means the base station may receive emergency alert messages to distribute to cellular devices via cellular broadcast.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 102 may be configured to support power consumption efficient operation of a UE 106 in conjunction with cellular broadcast service provision. In particular, the BS 102 may include hardware and software components for implementing (or for use in conjunction with a UE 106 implementing) part or all of a method for a UE 106 to operate efficiently in conjunction with cellular broadcast services.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Protocol Stack

Currently, a primary technique for distributing emergency alert messages includes the use of cellular broadcast messages. For example, an entity such as the Federal Emergency Management Agency (FEMA) in the United States, and similar entities in other countries, may be authorized to generate and distribute emergency alert messages to wireless carriers (e.g., cellular service providers), which may in turn distribute those emergency alert messages to cellular-capable devices which monitor compatible cellular broadcast channels via cellular broadcast techniques. An example of a cellular broadcast technique is the short message service—cellular broadcast (SMS-CB) format. An emergency alert SMS-CB message may include a text portion, and may include and/or cause a cellular device to use a unique ring tone and/or vibration to alert a user of the message. In some cases, an SMS-CB transmission may be limited in length, though generally multiple SMS-CB transmissions may be used (e.g., concatenated) to effectively transmit a longer emergency alert message if need be.

Support for such cellular broadcast services may be provided, on both base station and user equipment sides, using any of a variety of techniques, e.g., in conjunction with various techniques for providing other services via cellular communication.

One common practice for supporting cellular broadcast services (and cellular services generally) may include implementing multiple protocol layers as a protocol stack. FIG. 5 is a diagram illustrating one possible protocol stack which may be used by a wireless device (such as UE 106 illustrated in FIGS. 1-3) for supporting cellular broadcast services. The protocol stack illustrated in FIG. 5 may particularly be suitable for use in conjunction with wideband code division multiple access (WCDMA), a cellular communication technology within the UMTS family of cellular communication technologies. Note, however, that it may be possible to utilize the illustrated protocol stack (or an alternate protocol stack) in conjunction with any of a variety of other cellular communication technologies to implement aspects of the present disclosure, and that the details of FIG. 5 should accordingly not be considered limiting to the disclosure as a whole.

As illustrated, the protocol stack 500 may include a broadcast and multicast control (BMC) entity 502. The BMC 502 may operate as a portion (e.g., a task) of a non-access stratum (NAS) module, and may operate above a radio link control (RLC) entity 504 in the protocol stack. The RLC 504 may communicate (e.g., receive, on the UE side, or send, on the base station side) cellular broadcast service (CBS) messages over a common traffic channel (CTCH) logical channel 506. A medium access control (MAC) layer 508 may multiplex the CTCH 506 (e.g., possibly along with one or more other logical channels) onto a forward access channel (FACH) transport channel 510. The FACH 510 may then be multiplexed (e.g., possibly along with one or more other transport channels) onto a physical channel, such as a secondary common control physical channel (S-CCPCH), at a physical layer (Layer 1 or L1) 512.

Note that a UE implementing cellular communication techniques according to one or more cellular communication technologies may include additional and/or alternative protocol modules/layers in its protocol stack, and/or one or more of the illustrated protocol modules/layers may provide further functionality in addition to the functionality relating to cellular broadcast services described herein.

FIG. 6—Flowchart

Cellular broadcast services may in some cases be implemented using discontinuous reception (DRX) techniques. When utilizing discontinuous reception with cellular broadcast services, a UE device (e.g., such as illustrated in and described with respect to any of FIGS. 1-3) may alternate between active reception (e.g., monitoring the radio interface and decoding signals received thereon), and a reduced-power state (e.g., conserving power by powering down at least some radio components and not monitoring the radio interface), typically according to a schedule implemented by the broadcaster (e.g., a cellular base station) and communicated to the UE.

In many cases, an 'in-band' scheduling mechanism may be used to support this discontinuous reception for cellular broadcast services. For example, as one possibility, the broadcaster may structure their cellular broadcast communications in such a manner that certain "cellular broadcast scheduling periods" are specified by "cellular broadcast scheduling messages". Any cellular broadcast related information (e.g., including the cellular broadcast scheduling messages, as well as any cellular broadcast messages having content) may be transmitted on a channel used for cellular broadcast messages during the cellular broadcast scheduling periods (i.e., scheduling information for the channel may be transmitted in-band). In between those cellular broadcast scheduling periods, the broadcaster may not transmit any cellular broadcast related information on the channel, such that a UE may enter a low/reduced power or 'sleep' state with respect to its radio operations without missing any cellular broadcast related information.

FIG. 6 is a flowchart diagram illustrating a method for a UE device to efficiently support cellular broadcast services in such a discontinuous reception context. The method shown in FIG. 6 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 602, system information for a base station may be received. The system information may be received as a system information block (SIB), which may be broadcast (e.g., on a broadcast control channel or BCCH) by the base station to facilitate a UE configuring itself to communicate with the base station. The system information may include any of a variety of information relating to the configuration and parameters according to which the base station communicates. Included in such information may be information identifying various transport and/or logical channels which may be used for various types of communication (e.g., uplink and/or downlink control information and/or content data, paging information, broadcast messages, etc.).

For example, as one possibility, cellular broadcast related information may be communicated using a common traffic channel (CTCH) logical channel, which may be mapped to a forward access channel (FACH) transport channel, which may in turn be mapped to a secondary common control physical channel (S-CCPCH), such as illustrated in and described with respect to FIG. 5. In such a case, the SIB may include information indicating how each channel relates to each other, and possibly more particularly which timeslots or transmission time intervals of a given channel are mapped to any related channels.

Thus, in 604, based on the system information, the UE may determine channel configuration for a logical channel used for cellular broadcast communication. For example, continuing to consider the CTCH/FACH/S-CCPCH structure of FIG. 5, as one possibility the SIB might indicate at what offset, interval, and/or number of radio frames of the FACH the CTCH is carried. This may enable the UE to determine which signals received on the radio interface correspond to which physical, transport, and logical channels, which may in turn enable higher layer entities on the UE which utilize/interact with transport and/or logical channels (such as the RLC and BMC with the CTCH) to receive information on those channels. Other techniques and types of information for configuration relationships between physical, transport, and logical channels are also possible.

Thus, for example, based on the system information, the UE may thus be able to receive and decode information on the CTCH. Each set of CTCH MAC service data units/SDUs (RLC protocol data units/PDUs) received on the CTCH may be referred to as a "CTCH block set" or "CTCH-BS". This level of knowledge and scheduling may also be referred to as "level 1 scheduling", since it may be based on basic system configuration information (e.g., information received in an SIB) rather than based on scheduling information received on the CTCH itself.

Note that Level 1 scheduling may enable "level 1 DRX operation", insofar as the CTCH may be allocated intermittently (e.g., according to a period indicated in the SIB) on the FACH and/or S-CCPCH. However, level 1 scheduling may not be sufficient to enable a further level of DRX operation ("level 2 DRX operation") which relies on being able to determine when cellular broadcast related information is and is not scheduled for transmission on the CTCH.

However, by reading (e.g., receiving and decoding) the CTCH using level 1 scheduling, in 606 the BMC may eventually receive a cellular broadcast scheduling message (a "first" cellular broadcast scheduling message). The first cellular broadcast scheduling message may indicate a length and an offset (e.g., in CTCH-BSs) of the next cellular broadcast scheduling period, which may enable the BMC to initiate "level 2 scheduling". According to level 2 scheduling, the BMC may be able to indicate to the lower layers (e.g., RLC, MAC, and PHY/L1) when (e.g., during which CTCH-BSs) to monitor the CTCH, and/or when not to monitor the CTCH, such that the CTCH is monitored during the next cellular broadcast scheduling period, and not monitored (e.g., to conserve power) between cellular broadcast scheduling periods. In other words, level 2 cellular broadcast scheduling may enable level 2 DRX operation with respect to cellular broadcast services.

A cellular broadcast scheduling message (e.g., similar to the first cellular broadcast scheduling message) indicating scheduling parameters of the subsequent cellular broadcast scheduling period may be communicated during each cellular broadcast scheduling period. This may enable the BMC to indefinitely continue level 2 DRX operation with respect to cellular broadcast services. For example, each cellular broadcast scheduling message may indicate a length (e.g., in CTCH-BSs) of the subsequent cellular broadcast scheduling period and an offset indicating when (e.g., after how many CTCH-BSs) the subsequent cellular broadcast scheduling period begins. Each cellular broadcast scheduling message may also include additional scheduling parameters relating to any cellular broadcast messages which are scheduled for the subsequent cellular broadcast scheduling period, such as a new message bitmap and any message descriptions.

Thus, after the first cellular broadcast scheduling message, in 608 the UE may receive a subsequent ("second") cellular broadcast scheduling message during the cellular broadcast scheduling period scheduled by the first cellular broadcast scheduling message. That second cellular broadcast scheduling message may in turn schedule the subsequent cellular broadcast scheduling period, in which a further cellular broadcast scheduling message may be received, and so on, indefinitely, until interrupted (e.g., due to a handover procedure between base stations, cellular broadcast services being disabled, the UE being powered off, etc.).

During each cellular broadcast scheduling period, after the cellular broadcast scheduling message scheduling the subsequent cellular broadcast scheduling period is received, any cellular broadcast messages scheduled in a previous cellular broadcast scheduling period may also be received. If no cellular broadcast messages are scheduled for a given cellular broadcast scheduling period, it may be the case that no further cellular broadcast related information may be communicated on the channel used for cellular broadcast messages after the cellular broadcast scheduling message scheduling the subsequent cellular broadcast scheduling period is received.

It is possible that the length of a cellular broadcast scheduling period may exceed the length needed to communicate any cellular broadcast related information for that cellular broadcast scheduling period. This may be the case particularly if no cellular broadcast messages are scheduled for a given cellular broadcast scheduling period. For example, in such a case, the cellular broadcast scheduling message may require only a fraction (e.g., 3 or 4 CTCH-BSs, among various possibilities) of the length of the cellular broadcast scheduling period (e.g., 20, 30, or 40 CTCH-BSs, among various possibilities), and there may be no further cellular broadcast related information communicated once the cellular broadcast scheduling message scheduling the subsequent cellular broadcast scheduling period has been communicated. In such a case, if the UE were to continue to monitor and read the CTCH for the remainder of the cellular broadcast scheduling period, no further information would be received (i.e., any signals received over the radio interface would not contain any useful information, and would be expected to fail a cyclic redundancy check/CRC or other error detection mechanism), and a significant amount of power would be unnecessarily consumed by continuing to actively monitor the CTCH.

Thus, in 610, it may be determined that all expected communication for the second cellular broadcast scheduling period is complete, and in 612, an indication may be provided to a lower layer to sleep for the remainder of the second cellular broadcast scheduling period based on determining that all expected communication for the second cellular broadcast scheduling period is complete. The expected communication for the second cellular broadcast scheduling period may include at least the second cellular broadcast scheduling message, as noted above. In some cases the expected communication for the second cellular broadcast scheduling period may include only the second cellular broadcast scheduling message, for example if no other cellular broadcast messages are scheduled for the second cellular broadcast scheduling period. In other cases, the expected communication for the second cellular broadcast scheduling period may include one or more cellular broadcast messages in addition to the second cellular broadcast scheduling message.

More generally, a UE may be configured to make such a determination and indication in each cellular broadcast scheduling period, if appropriate. For example (continuing the exemplary scenario of FIG. 5), a UE may determine that all communication of cellular broadcast related information has been completed for any given cellular broadcast scheduling period, and thereby determine and indicate to the lower layers not to actively monitor the CTCH for cellular broadcast related information for the remainder of the given cellular broadcast scheduling period. In this way, the CTCH may be read for as much of each cellular broadcast scheduling period as cellular broadcast related information is being communicated, after which the UE (or at least a portion thereof) may go to sleep (potentially prior to the end of that cellular broadcast scheduling period) until the next cellular broadcast scheduling period.

As one possibility for providing such a capability, when scheduled to monitor the CTCH for cellular broadcast related information, the lower layers (L1/MAC/RLC) may provide decoded CTCH information to the BMC on a CTCH-BS-by-CTCH-BS basis. The RLC may also indicate the last system frame number (SFN) of each RLC SDU to the BMC.

Based on a previously received cellular broadcast scheduling message, the BMC may be aware of which messages are expected during the cellular broadcast scheduling period, but may not know the exact length of all such messages (e.g., since the length/content of the scheduling message for the subsequent scheduling period, which is communicated in the current scheduling period, may not have been known in the previous scheduling period in which a scheduling message for the current scheduling period was communicated). However, by reading the content of each CTCH-BS as it is received, the BMC may be able to identify whether or not that content corresponds to an expected message (e.g., a scheduling message providing scheduling information for the subsequent period, or a scheduled cellular broadcast message), and may be able to determine when all expected messages are complete.

Once any expected messages are completed, any further CTCH-BSs may lack content and may accordingly fail CRC and/or any other message integrity checks. Thus, having determined that all expected messages are completed, the BMC may then indicate to the lower layers to sleep for the remaining CTCH-BSs of the cellular broadcast scheduling period, without missing any content. If the RLC provides the last SFN for each RLC SDU, the BMC may more particularly identify the SFNs corresponding to remaining CTCH-BSs of the current scheduling period and indicate to the RLC to skip monitoring the radio interface and decoding radio signals for those SFNs.

Thus, the method illustrated in FIG. 6 may enable a UE to improve the efficiency of its operation with respect to cellular broadcast services in at least some instances. In particular, by providing the capability to determine if all cellular broadcast related information has been received prior to the end of a cellular broadcast scheduling period, a UE may be able to enter a sleeping state prior to the end of the cellular broadcast scheduling period without missing any cellular broadcast related information, thereby further (e.g., in addition to scheduled DRX down-times) conserving power without sacrificing performance.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A wireless user equipment (UE) device, comprising:
   a radio, comprising one or more antennas configured for wireless communication; and
   a processing element operatively coupled to the radio;
   wherein the radio and processing element are configured to:
   receive a system information block (SIB) from a cellular base station via cellular communication, wherein the SIB comprises cellular broadcast configuration information indicating channel configuration of a common traffic channel (CTCH), wherein the CTCH is a logical channel on which cellular broadcast communication is performed;
   determine channel configuration of the CTCH based on the SIB;
   receive a first cellular broadcast scheduling message on the CTCH, wherein the first cellular broadcast scheduling message schedules a second cellular broadcast scheduling period;
   receive a second cellular broadcast scheduling message on the CTCH during the second cellular broadcast scheduling period, wherein each respective CTCH block set received in the second cellular broadcast scheduling period is provided from a radio link control (RLC) layer of the UE to a broadcast-multicast control (BMC) layer as the respective CTCH block set is decoded by the RLC entity;
   determine that all expected communication for the second cellular broadcast scheduling period is complete prior to an end of the second cellular broadcast scheduling period by identifying whether content of each respective CTCH block set received in the second cellular broadcast scheduling period corresponds to an expected message as the respective CTCH block set is received by the BMC layer;
   enter a reduced-power state of operation for a remainder of the second cellular broadcast scheduling period based on determining that all expected communication for the second cellular broadcast scheduling period is complete.

2. The UE of claim 1,
   wherein entering the reduced-power state comprises powering down one or more radio components.

3. The UE of claim 1,
   wherein the radio and the processing element are further configured to:
   provide an indication from the BMC layer to the RLC layer to skip reception of the CTCH for the remainder of the second cellular broadcast scheduling period,
   wherein entering a reduced-power state of operation for a remainder of the second cellular broadcast scheduling period is based on the indication.

4. The UE of claim 1,
   wherein each cellular broadcast scheduling message schedules a subsequent cellular broadcast scheduling period by indicating an offset at which the subsequent cellular broadcast scheduling period will occur and a length of the subsequent cellular broadcast scheduling period.

5. The UE of claim 4,
   wherein each cellular broadcast scheduling message further indicates if any cellular broadcast messages are scheduled for the subsequent cellular broadcast scheduling period.

6. The UE of claim 1,
   wherein the first cellular broadcast scheduling message indicates that only the second cellular broadcast scheduling message is scheduled for the second cellular broadcast scheduling period,
   wherein determining that all expected communication for the second cellular broadcast scheduling period is complete comprises determining that the second cellular broadcast scheduling message is complete.

7. A method for a broadcast-multicast control (BMC) entity operating in a cellular device to facilitate support of cellular broadcast services by the cellular device, the method comprising:
   receiving, at the BMC entity, a first cellular broadcast scheduling message, wherein the first cellular broadcast scheduling message schedules a second cellular broadcast scheduling period;
   receiving, at the BMC entity, a second cellular broadcast scheduling message during the second cellular broadcast scheduling period, wherein each respective decoded common traffic channel (CTCH) block set of the second cellular broadcast scheduling message is received at the BMC entity from a lower layer entity operating in the cellular device as the respective CTCH block set is decoded by the lower layer entity;
   determining, by the BMC entity, that all messages expected in the second cellular broadcast scheduling period have been received prior to an end of the second cellular broadcast scheduling period, wherein said determining is based at least in part on reading content of each respective CTCH block set of the second cellular broadcast scheduling message as the respective CTCH block set is received at the BMC entity;
   providing, by the BMC entity, an indication to a lower layer entity to sleep for a remainder of the second cellular broadcast scheduling period in response to determining that all messages expected in the second cellular broadcast scheduling period have been received prior to the end of the second cellular broadcast scheduling period.

8. The method of claim 7,
wherein the first cellular broadcast scheduling message is received according to level 1 scheduling based on information received in a system information block (SIB) broadcast by a cell to which the cellular device is attached,
wherein the second cellular broadcast scheduling message is received according to level 2 scheduling based on information received in the first cellular broadcast scheduling message.

9. The method of claim 7,
wherein the BMC entity receives the first cellular broadcast scheduling message and the second cellular broadcast scheduling message on a logical channel configured for broadcast and multicast usage,
wherein the logical channel configured for broadcast and multicast usage is mapped to a physical channel by the lower layer entity.

10. The method of claim 9, the method further comprising:
providing, by the BMC entity, an indication to the lower layer entity to read the logical channel configured for broadcast and multicast usage during the second cellular broadcast scheduling period based on the first cellular broadcast scheduling message,
wherein the indication to sleep for the remainder of the second cellular broadcast scheduling period supersedes the indication to read the logical channel configured for broadcast and multicast usage during the second cellular broadcast scheduling period.

11. The method of claim 9,
wherein the logical channel configured for broadcast and multicast usage is not monitored between receiving the first cellular broadcast scheduling message and a beginning of the second cellular broadcast scheduling period.

12. The method of claim 7,
wherein the lower layer entity is a radio link control (RLC) entity.

13. The method of claim 7,
wherein the first cellular broadcast scheduling message indicates a length of the second cellular broadcast period and an offset at which the second cellular broadcast scheduling period begins.

14. A non-transitory computer accessible memory medium comprising program instructions for a wireless user equipment (UE) device to efficiently support cellular broadcast services, wherein when executed, the program instructions cause the UE to:
monitor a common traffic channel (CTCH) for cellular broadcast messages in a discontinuous manner, comprising:
between each respective pair of cellular broadcast scheduling periods of a plurality of cellular broadcast scheduling periods, operating in a reduced power state;
during each respective cellular broadcast scheduling period of the plurality of cellular broadcast scheduling periods, receive at least a respective cellular broadcast scheduling message, wherein content of messages received during each respective cellular broadcast scheduling period are read as each CTCH block set is received on a CTCH block set by CTCH block set basis by a broadcast-multicast control (BMC) entity of the UE;
during each respective cellular broadcast scheduling period of the plurality of cellular broadcast scheduling periods, determine if all scheduled cellular broadcast messages are received based on reading each CTCH block set as it is received on a CTCH block set by CTCH block set basis by the BMC entity of the UE; and
if all scheduled cellular broadcast messages are received prior to an end of a respective cellular broadcast scheduling period, operating in the reduced power state for a remainder of the respective cellular broadcast scheduling period after all scheduled cellular broadcast messages are received.

15. The memory medium of claim 14,
wherein each respective cellular broadcast scheduling message comprises information scheduling a subsequent cellular broadcast scheduling period.

16. The memory medium of claim 14,
wherein determining if all scheduled cellular broadcast messages are received is also based on scheduling information for the respective cellular broadcast scheduling period received in a prior cellular broadcast scheduling message.

17. The memory medium of claim 14,
wherein operating in the reduced power state for a remainder of a respective cellular broadcast scheduling period after all scheduled cellular broadcast messages are received if all scheduled cellular broadcast messages are received prior to the end of the respective cellular broadcast scheduling period comprises operating in the reduced power state during all remaining CTCH block-sets of the respective cellular broadcast scheduling period.

18. The memory medium of claim 14,
wherein the CTCH is mapped to a forward access channel (FACH) transport channel, wherein the FACH is mapped to a secondary common control physical channel (S-CCPCH).

19. The memory medium of claim 14, wherein when executed, the program instructions further cause the UE to:
receive a cellular broadcast message during at least one cellular broadcast scheduling period.

* * * * *